United States Patent [19]  
Crouch

[11] 4,176,071  
[45] Nov. 27, 1979

[54] CORROSION INHIBITOR MIXTURE FOR AMMONIUM SULFATE FIRE-RETARDANT COMPOSITIONS AND METHOD FOR INHIBITING CORROSIVITY OF SUCH COMPOSITIONS

[75] Inventor: Robert L. Crouch, Phoenix, Ariz.

[73] Assignee: Early California Industries, Inc., Phoenix, Ariz.

[21] Appl. No.: 919,166

[22] Filed: Jun. 26, 1978

[51] Int. Cl.² ............................................. C09K 3/28
[52] U.S. Cl. .................................... 252/8.1; 169/45; 252/2; 252/389 A

[58] Field of Search ......................... 252/2, 389 A, 8.1; 169/45

[56] References Cited

U.S. PATENT DOCUMENTS

| | | | |
|---|---|---|---|
| 3,275,566 | 9/1966 | Langguth | 252/2 X |
| 3,293,189 | 12/1966 | Morgenthaler | 252/2 X |
| 3,309,324 | 3/1967 | Langguth et al. | 252/2 X |
| 3,758,641 | 9/1973 | Zweigle | 252/2 X |

Primary Examiner—Leland A. Sebastian

[57] ABSTRACT

A corrosion inhibitor mixture for ammonium sulfate-based fire-retardant compositions includes a water-soluble cyanide compound and ammonium phosphate.

2 Claims, No Drawings

CORROSION INHIBITOR MIXTURE FOR AMMONIUM SULFATE FIRE-RETARDANT COMPOSITIONS AND METHOD FOR INHIBITING CORROSIVITY OF SUCH COMPOSITIONS

This invention concerns a corrosion inhibitor mixture.

More particularly, the invention relates to a corrosion inhibitor mixture for ammonium sulfate-based fire-retardant compositions.

According to a further aspect, the invention relates to corrosion inhibited ammonium sulfate fire-retardant compositions.

According to still another aspect, the invention concerns methods for inhibiting the corrosivity of ammonium sulfate fire-retardant compositions to aluminum, steel and brass.

Ammonium sulfate-based fire-retardant compositions are well known in the art. For example, U.S. Pat. No. 3,196,108 to Nelson discloses fire-retardant slurries, especially adapted for aerial application, which may include ammonium sulfate as the electrolytic fire suppressant salt, water, a thickening agent (e.g., attapulgite clay), suitable coloring agents (red iron oxide) and a conventional corrosion inhibitor (e.g., sodium dichromate). Such compositions function very effectively in combating forest fires and/or, by pre-application to vegetation, to suppress or prevent ignition of the combustible material.

Ammonium sulfate fire-retardants are also known which contain other thickening agents, such as guar gum, carboxymethylcellulose, algin, etc., and may contain other types of coloring agents such as various dyes.

The prior art ammonium sulfate fire-retardant compositions, which have achieved wide use by various governmental and private forest and range fire control organizations, are generally applied to the vegetation by aerial application, i.e., by dropping the slurry in a dense mass from fixed wing aircraft or from helicopters. Inasmuch as these fire-retardant compositions, as well as others based on other electrolytic fire-retardant salts (e.g., liquid ammonium polyphosphate) are in contact with or may be deposited on the aircraft, rigorous corrosivity specifications have been adopted. Although such specifications have been in existence for a number of years, compliance with the specification was unobtainable in the case of ammonium sulfate-based fire-retardants until the present invention.

The corrosion specifications which control the procurement of fire-retardant compositions by the U.S. Government and which have been adopted, expressly or inferentially, by various state governments and other fire control units, as well as foreign governments, are set forth in Specification 5100-00301a (February 1975), as amended June 1977, issued by the United States Department of Agriculture, Forest Service, and require that the retardant composition be inhibited to prevent corrosion to a standard aluminum alloy (2024-T3), mild steel (AISI C-1010) and brass (Fed. Spec. QQ-B-626, Composition 22) of less than 1 mil (0.001") per year, as determined by test procedures set forth in the specifications. Compliance with the above-described corrosion specifications has been very difficult, if not unobtainable, for several reasons. First, various corrosion inhibitors which have been previously considered as effective in the prior art simply cannot meet these new, more rigorous corrosion specifications. Secondly, problems have been encountered in meeting the corrosion specifications for all three of the above-identified metals because an inhibitor which may be effective for one or more of the metals may actually be highly corrosive to the others. For example, while it is generally known that various phosphates are effective corrosion inhibitors for steel, such phosphates actually are highly corrosive to brass and other copper-based alloys. Similarly, complex cyanide compounds may provide the requisite inhibition of the corrosivity of ammonium sulfate to aluminum or brass but do not satisfactorily inhibit the corrosivity of such fire-retardants to steel.

Accordingly, it would be highly desirable to provide a corrosion inhibiting mixture which reduces the corrosiveness of ammonium sulfate-based compositions to meet the corrosion specifications for aerially applied fire-retardants.

It is therefore an object of the present invention to provide a corrosion inhibitor mixture for ammonium sulfate-based fire-retardant compositions.

Yet another object of the invention is to provide a method for inhibiting the corrosivity of ammonium sulfate fire-retardant compositions.

These and other, further and more specific objects and advantages of the invention will be apparent from the following description thereof and the working examples.

In accordance with the invention, I have now discovered ammonium sulfate fire-retardant compositions comprising a slurry of ammonium sulfate, water and a thickening agent and a corrosion inhibitor system including a water-soluble cyanide compound and a water-soluble ortho-phosphate. Such compositions equal or exceed the U.S. Government specifications for corrosivity to mild steel, brass and aluminum as set forth in the above-described corrosion specifications.

According to another aspect of the invention, I have now discovered a method of inhibiting the corrosivity of ammonium sulfate fire-retardant compositions to mild steel, brass and aluminum comprising the step of incorporating therein a corrosion inhibitor mixture, including a water-soluble cyanide compound and a water-soluble ortho-phosphate.

The corrosion inhibitor mixture is incorporated in ammonium sulfate fire-retardant compositions in a minor effective amount, i.e., sufficient to reduce the corrosivity of the fire-retardant composition to mild steel, brass and aluminum to less than 1 mil per year as determined by the test methods set forth in the above-described U.S.D.A. specification. The exact amounts of the cyanide and phosphate components of the corrosion inhibitor system to be incorporated to achieve such results will vary somewhat, depending on the particular cyanide compound used, the exact composition and concentration of the ammonium sulfate fire-retardant composition and other pertinent factors. However, in general, it is found that a concentration of about 0.125 wt.% of the cyanide compound and about 1.25 wt.% of phosphate in the final mixed retardant composition will provide the desired degree of corrosion inhibition in compliance with the above-described corrosion specifications for aluminum, mild steel and brass.

The cyanide compound which is utilized in the practice of the invention can be any water-soluble cyanide compound containing a —CN group, preferably an inorganic complex cyanide such as alkali metal or alkaline earth metal ferrocyanide, ferricyanide, or nitroprusside. For example, complex cyanide salts such as sodium or potassium ferrocyanide, sodium or potassium nitroprusside, sodium or potassium ferricyanide are effectively employed, as well as other water-soluble complex cyanide compounds such as potassium hexacyanocobaltate, ammonium mitroferrocyanide and the like. In the preferred embodiment of the invention, I employ sodium ferrocyanide.

The ortho-phosphate component of the corrosion inhibitor system of the invention can be any water-soluble ortho-phosphate such as, for example, alkali metal and ammonium ortho-phosphates, especially trisodium phosphate, monosodium dihydrogen phosphate, disodium monohydrogen phosphate, as well as the corresponding potassium ortho-phosphates. Ammonium phosphates, especially di-ammonium phosphate, are preferred as they are also electrolytic fire-retardant salts.

The cyanide and phosphate components of the corrosion inhibitor mixture of the present invention can be incorporated into the ammonium sulfate fire-retardant compositions at any stage of their manufacture. For example, the ammonium sulfate, thickeners and the corrosion inhibitor mixture components can be dry-mixed and stored and transported in that form until the composition is further mixed with water to form the final mixed fire-retardant slurry composition. Alternately, the dry-mixed components of the composition can be mixed with a preliminary quantity of water and stored and transported as a liquid concentrate to the aircraft loading site where additional water is added to form the final mixed retardant composition. According to yet another alternate procedure, the retardant mixture components can be premised with the water which is used to convert the dry-mixed ammonium sulfate, color and thickener components to the final mixed retardant slurry composition.

In addition to improving the uniform corrosion rate of ammonium sulfate solutions, as described above, I have also discovered that the corrosion inhibitor mixture of the present invention provides a dramatic improvement in the so-called "fatigue" corrosion characteristics of aluminum. This effect is due to the cyanide component of the inhibitor system of the present invention.

The following examples are presented, not by way of limitation of the scope of the invention, but to illustrate to those skilled in the art the practice of various of the presently preferred embodiments of the invention and to distinguish the invention from the prior art.

EXAMPLE 1

The following components are dry-mixed:

| Component | Weight (lbs.) |
|---|---|
| Ammonium sulfate (electrolytic fire-retardant salt) | 585 |
| Red iron oxide (coloring agent) | 10 |
| Guar gum (thickener) | 37 |
| Dowisil 75* (spoilage inhibitor) | 2 |

*Trademark of Dow Chemical Company for allychloride salt of diazoadamantane

A corrosion inhibitor mixture consisting of di-ammonium phosphate and sodium ferrocyanide is dry-mixed with the above composition. The inhibitor mixture is composed of:

| Component | Weight (lbs.) |
|---|---|
| Di-ammonium phosphate | 50 |
| Sodium ferrocyanide | 5 |

The ammonium sulfate fire-retardant composition containing the corrosion inhibitor mixture is mixed with 392 gallons of water to form a final mixed fire-retardant slurry composition suitable for aerial application which exhibits corrosivity to brass, aluminum and mild steel of less than 1 mil per year as determined by the procedure described in the above-identified corrosion specification.

EXAMPLE 2

The weight percentage of the sodium ferrocyanide and ammonium phosphate components of the fire-retardant composition of Example 1 are varied to demonstrate the effect on the uniform corrosion rate of the final mixed composition to aluminum, mild steel and brass, as follows:

Table A

| Effect of Varying Concentration of Inhibitor System Components on Corrosivity of Mixed Slurry Composition | | | | |
|---|---|---|---|---|
| CORROSION INHIBITOR SYSTEM COMPONENTS (% by wt. in mixed slurry) | | UNIFORM CORROSION RATE (Mils/yr per Spec. 5100-00301a) | | |
| $K_4Fe(CN)_6$ | $(NH_4)_2HPO_4$ | Aluminum | Mild Steel | Brass |
| 0 | 1.25 | .21 | .65 | 2.75 |
| .125 | 1.25 | .17 | .96 | .12 |
| .125 | 0 | .09 | 9.65 | .06 |
| .125 | .25 | .01 | 1.77 | .15 |
| .125 | .625 | .01 | 1.35 | .04 |
| .125 | 1.0 | .18 | 1.45 | .06 |
| .125 | 1.25 | .20 | .65 | .12 |

EXAMPLE 3

Other cyanide and phosphate compounds were tested as components of the corrosion inhibitor system in place of the components set forth in Example 1. The results are set forth below. Note that use of a phosphate other than an ortho-phosphate does not result in achieving the desired uniform corrosion rate.

Table B

| Effect of Varying CN— and $PO_4\equiv$ Compounds on Corrosivity of Mixed Slurry Composition | | | | | | |
|---|---|---|---|---|---|---|
| CN— Compound | % in mixed slurry | $PO_4\equiv$ Compound | % in mixed slurry | UNIFORM CORROSION RATE (Mils/yr per Spec. 5100-00301a) | | |
| | | | | Aluminum | Mild Steel | Brass |
| $K_3[CO(CN)_6]$ | 0 | $(NH_4)_2HPO_4$ | 1.25 | 0.1 | 0.7 | 6.95 |
| $K_3[CO(CN)_6]$ | 0.125 | $(NH_4)_2HPO_4$ | 1.25 | 0.1 | 0.69 | nil |
| $NA_3Fe(CN)_6$ | 0.125 | Sodium Tri- | 0.125 | 0.14 | 3.3 | 1.2 |

Table B-continued

Effect of Varying CN— and PO$_4\equiv$ Compounds on Corrosivity of Mixed Slurry Composition

| CN— Compound | % in mixed slurry | PO$_4\equiv$ Compound | % in mixed slurry | UNIFORM CORROSION RATE (Mils/yr per Spec. 5100-00301a) | | |
|---|---|---|---|---|---|---|
| | | | | Aluminum | Mild Steel | Brass |
| Na$_3$Fe(CN)$_6$ | 0.125 | polyphosphate (NA$_5$P$_3$O$_{10}$) Sodium Tripolyphosphate (Na$_5$P$_3$O$_{10}$) | 1.25 | 1.3 | 1.83 | 1.2 |

EXAMPLE 4

When inhibited with 0.125 wt.% Na$_2$Cr$_2$O$_7$ the uniform corrosion rates of the ammonium sulfate composition of Example 1 were:

| Metal | Corrosion Rate (mpy) |
|---|---|
| Aluminum | 0.1 |
| Mild Steel | 4.1 |
| Brass | 1 |

EXAMPLE 5

This example illustrates the improvement in corrosion fatigue characteristics of aluminum which results from contacting the metal with a fire-retardant composition containing the cyanide component of the corrosion inhibitor system of the present invention.

A test specimen of aluminum alloy (2024-T3) measuring 14"×½"×¼" is oriented in the long transverse direction, notched at the center, degreased and inserted through slits cut in the side wall of a polyethylene bottle. The slits are sealed around the test beam with silicone caulking and the bottle is filled with the corrosion inhibited fire-retardant composition of Example 1. The ends of the specimen are then attached to the vice and the crank of a Fatigue Dynamics VSP-150 plate bending machine and the loading is adjusted to 11 Ksi.

The test beam is then stressed at 1000 cycles/min. at 70° F. until the specimen breaks.

With only air in the polyethylene bottle, the test specimen breaks at 525,000 cycles. Duplicate tests with the bottle filled with the inhibited retardant composition of Example 1 (containing 0.125 wt.% sodium ferrocyanide) were conducted and the following data obtained:

| Test Number | Cycles to Failure |
|---|---|
| 1 | 811,000 |
| 2 | 1,075,500 |

Having described my invention in such terms as to enable those skilled in the art to understand and practice it, and having identified the presently preferred embodiments thereof, I claim:

1. A corrosion inhibitor mixture for ammonium sulfate fire-retardant compositions, said compositions generally including
    ammonium sulfate,
    a thickening agent, and
    water,
said mixture comprising:
    (a) a water-soluble cyanide compound; and
    (b) a water-soluble ortho-phosphate compound,
said components of said corrosion inhibitor system being present in said fire-retardant composition in a minor effective amount at least sufficient to inhibit the corrosivity of said fire-retardant composition to aluminum, mild steel and brass to less than 1 mil per year.

2. A method for inhibiting the corrosivity of ammonium sulfate fire-retardant compositions comprising the step of incorporating therein a corrosion inhibitor mixture, including
    (a) a water-soluble cyanide compound; and
    (b) ammonium phosphate,
said corrosion inhibitor mixture being present in said composition in a minor effective amount at least sufficient to inhibit the corrosivity of said fire-retardant composition to aluminum, mild steel and brass to less than 1 mil per year.

* * * * *